United States Patent
de Sallier Dupin

(10) Patent No.: US 9,386,130 B2
(45) Date of Patent: Jul. 5, 2016

(54) METHOD OF COMMUNICATIONS IN A NETWORK INTERCONNECTING AT LEAST TWO POWER GENERATORS, AND CORRESPONDING INTERFACING DEVICE

(71) Applicant: SDMO Industries S.A.S., Brest (FR)

(72) Inventor: Jean François de Sallier Dupin, Plouvien (FR)

(73) Assignee: SDMO Industries S.A.S., Brest (FR)

( * ) Notice: Subject to any disclaimer, the term of this patent is extended or adjusted under 35 U.S.C. 154(b) by 85 days.

(21) Appl. No.: 14/307,236

(22) Filed: Jun. 17, 2014

(65) Prior Publication Data

US 2014/0369361 A1    Dec. 18, 2014

(30) Foreign Application Priority Data

Jun. 17, 2013    (FR) ...................................... 13 55659

(51) Int. Cl.
| | |
|---|---|
| H04L 12/26 | (2006.01) |
| H04L 29/14 | (2006.01) |
| H04B 1/04 | (2006.01) |
| G06F 1/26 | (2006.01) |
| G06F 1/30 | (2006.01) |

(52) U.S. Cl.
CPC ................ H04L 69/40 (2013.01); G06F 1/263 (2013.01); G06F 1/30 (2013.01); H04B 1/0483 (2013.01)

(58) Field of Classification Search
None
See application file for complete search history.

(56) References Cited

U.S. PATENT DOCUMENTS

| | | | |
|---|---|---|---|
| 6,295,609 B1 | 9/2001 | Cargemel et al. | |
| 2009/0327842 A1* | 12/2009 | Liu ........................ | H04L 1/0057 714/776 |
| 2010/0046364 A1* | 2/2010 | Sugizaki ............... | H04L 1/1858 370/216 |
| 2010/0124196 A1* | 5/2010 | Bonar .................. | H04B 7/0689 370/329 |
| 2011/0307110 A1* | 12/2011 | Sharma .................... | G06F 1/26 700/291 |
| 2012/0097666 A1 | 4/2012 | Pohl et al. | |
| 2012/0233326 A1* | 9/2012 | Shaffer ................. | H04W 4/005 709/225 |
| 2013/0185084 A1* | 7/2013 | Rajendran ............... | G10L 19/04 704/500 |
| 2014/0177477 A1* | 6/2014 | Cachin .................. | H04L 45/128 370/256 |

(Continued)

FOREIGN PATENT DOCUMENTS

| | | |
|---|---|---|
| EP | 0918388 A1 | 5/1999 |
| EP | 1311091 A1 | 5/2003 |

OTHER PUBLICATIONS

FR Search Report for Application No. FR1355659 dated Apr. 4, 2014 (7 pages).

(Continued)

Primary Examiner — Otis L Thompson, Jr.
(74) Attorney, Agent, or Firm — Michael Best & Friedrich LLP

(57) ABSTRACT

A method of communications in a network interconnecting at least two power generators, each power generator being connected to said network by means of at least one interfacing device capable of sending and receiving communications frames, said frames comprising at least one piece of supervision data and at least one piece of information data. The method may include a step for sending during which the same pieces of information data are sent at least twice, two operations for sending frames to be sent that comprise identical pieces of information data being separated in time by a predetermined time interval, and a step for receiving, implementing a systematic elimination of one of the frames received when two frames comprising identical pieces of information data have been received.

9 Claims, 9 Drawing Sheets

(56) References Cited

U.S. PATENT DOCUMENTS

2014/0316584 A1* 10/2014 Matsuoka .......... G05D 23/1917 700/278
2015/0074484 A1* 3/2015 Baduge ............... H04L 43/0829 714/749

OTHER PUBLICATIONS

PCT International Search Report for Application No. PCT/EP2014/062764 dated Jul. 18, 2014 (5 pages).
Co-pending U.S. Appl. No. 14/899,452, filed Dec. 17, 2015.

* cited by examiner

From Top to Bottom
Management of defect: power production means insufficient on "On" command (Network #1 plant)
 Power from plant available according to generator, available in automatic mode... Current power of load
Synthesis: production means insufficient.
Defect: production means insufficient. Stop test under load. Lock test under load. Disable Network #1 production demand
Right Column : Generator 1; Automatic; Manual; Automatic test; Out of service.
Close generator circuit-breaker; Close standby circuit-breaker; Close normal circuit-breaker

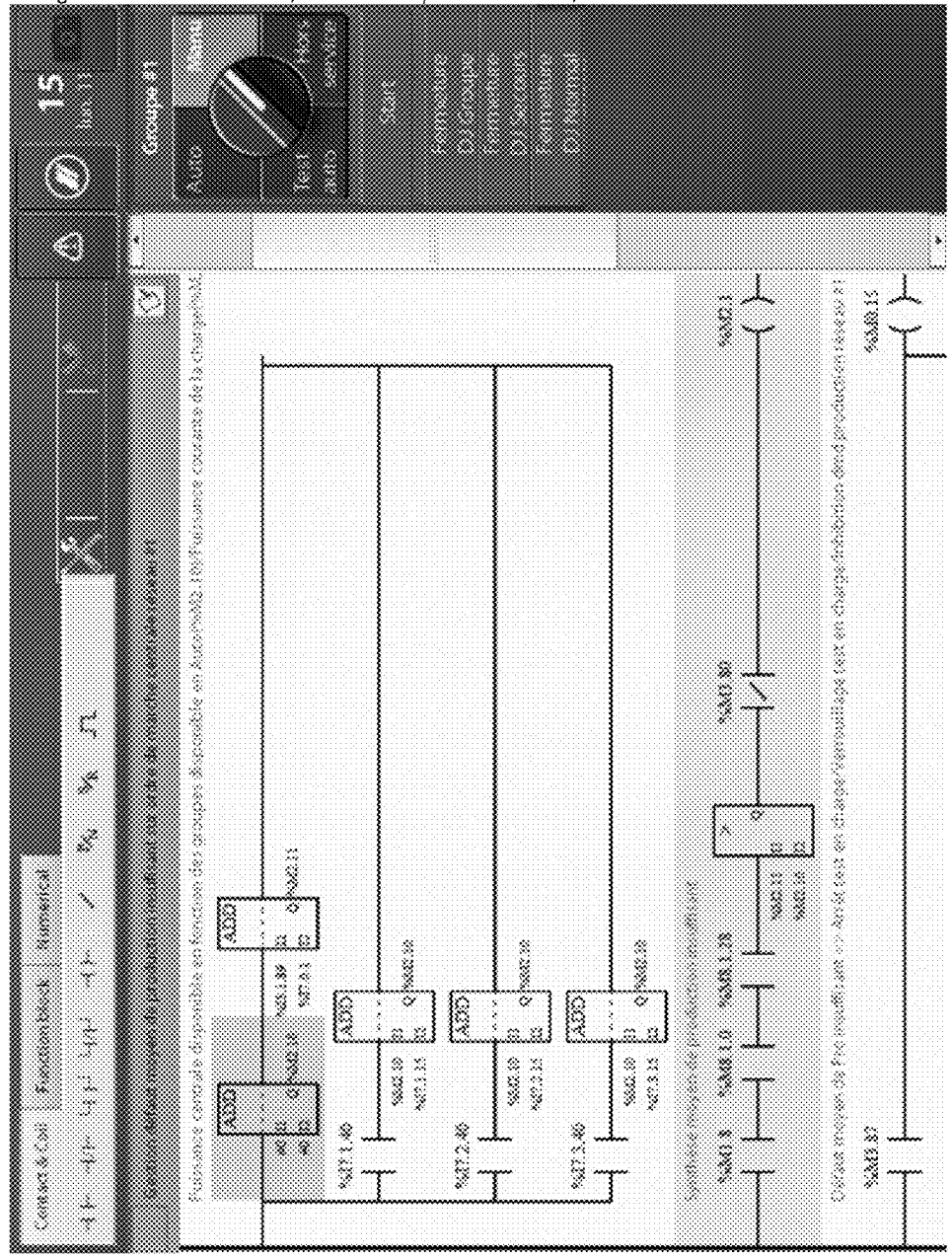

Fig. 8

From Top to Bottom
Management of defect: power production means insufficient on "On" command (Network #1 plant)
 Power from plant available according to generator, available in automatic mode... Current power of load
Synthesis: production means insufficient.
Defect: production means insufficient. Stop test under load. Lock test under load. Disable Network #1 production demand
  Right Column : Generator 1; Automatic; Manual; Automatic test; Out of service.
  Close generator circuit-breaker; Close standby circuit-breaker; Close normal circuit-breaker

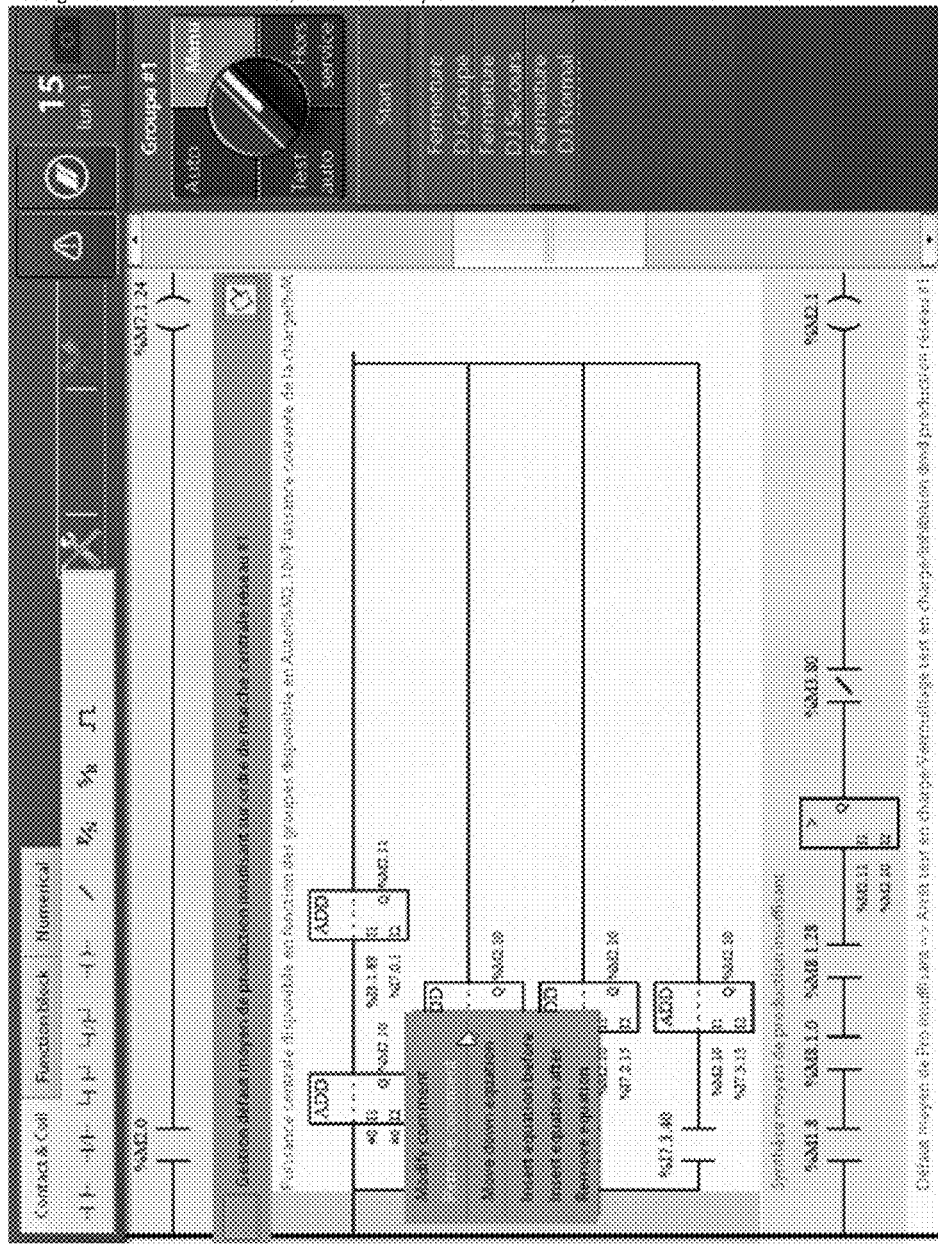

Fig. 9

From Top to Bottom

Management of defect: power production means insufficient on "On" command (Network #1 plant)
Plant power available according to generators available in automatic mode...Current power of load
Synthesis: production means insufficient
Defect: production means insufficient→ Stop load test/Lock load test/Disable network #1production demand
Defect: production means insufficient→Maintain normal operations/Network production demand
Send: absence of network #1 voltage via Inter bus APM802; time-out on bus #1variable
Normal maintenance
Defect management
Output network
Back-up opening command
Back-up closing command
Right Column : Generator 1; Automatic; Manual; Automatic test; Out of service.
Close generator circuit-breaker; Close standby circuit-breaker; Close normal circuit-breaker

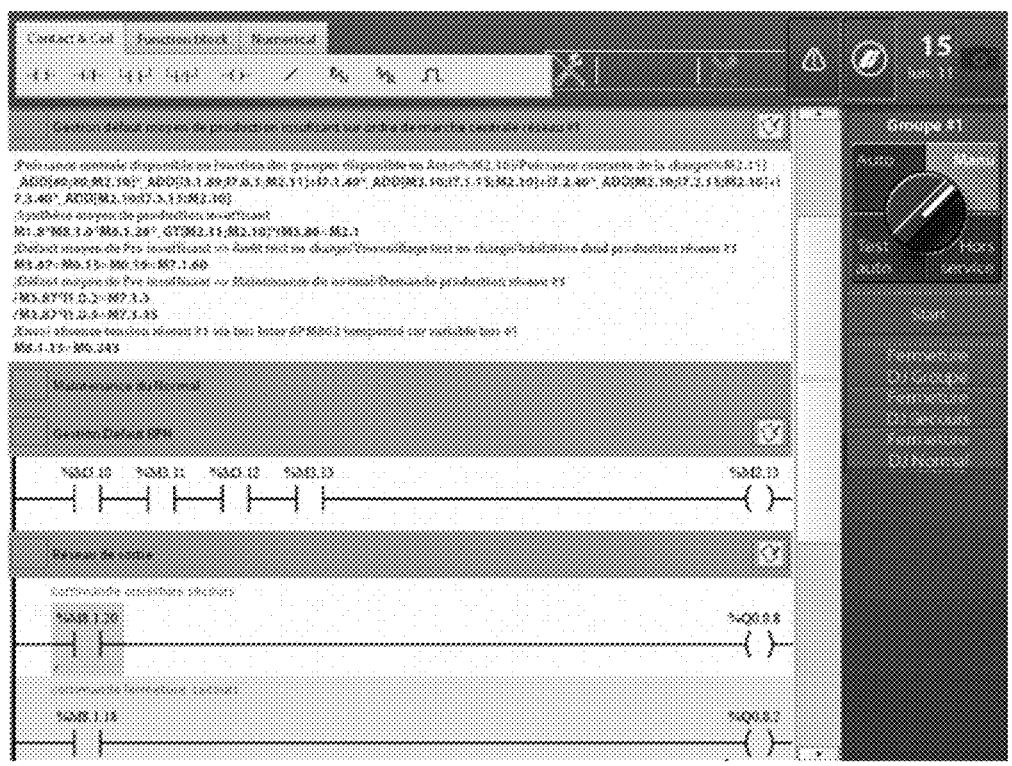

Fig. 10

METHOD OF COMMUNICATIONS IN A NETWORK INTERCONNECTING AT LEAST TWO POWER GENERATORS, AND CORRESPONDING INTERFACING DEVICE

FIELD OF THE INVENTION

The present invention relates to a method of communications in a network interconnecting at least two power generators, and corresponding interfacing device.

The field of the invention is that of the controlling of power generators, and especially of isolated or "solo" power generators with or without source inverters, grouped together in "power plants", possibly coupled with low-voltage or medium-voltage electricity distribution networks.

Such plants can be installed especially in hospitals, banks, industrial buildings, data centers and centers for the production of raw materials (especially in the oil, gas and mining sectors).

SUMMARY

Embodiments of the invention pertain to a method of communications in a network interconnecting at least two power generators, each power generator being connected to said network by means of at least one device for interfacing (or interfacing device) capable of sending and receiving communications frames, said frames comprising at least one piece of supervision data and at least one piece of information data.

According to embodiments of the invention, the method comprises a step for sending during which the same pieces of information data are sent at least twice, two operations for sending frames to be sent that comprise identical pieces of information data being separated in time by a predetermined time interval, and a step for receiving, implementing a systematic elimination of one of the frames received, when two frames comprising identical pieces of information data have been received.

Thus, certain embodiments of the invention make it possible to protect the network against the consequences of the appearance of a defect, for example a defect that has appeared on a communications bus belonging to the communications network or to a control module of one of the control devices of power generator. This type of defect can appear in the surroundings of power generators, which are generally installed in unprotected environments (unprotected from dust, temperature, humidity, etc.) in which the electrical and electromagnetic phenomena are very great. There are also risks of deterioration of a cable of the network.

According to one particular embodiment of the invention, said network is a self-recovering network capable of modifying a routing of a frame in the event of detection of an accidental cut in a portion of said network and said predetermined time interval is greater than or equal to a maximum time of recovery of said network.

Thus, in the event of failure of a sending of a first frame, a second frame comprising the same pieces of information data as the first frame can be routed in a manner that is different to that of the routing used during the sending of the first frame.

Such typologies enable an operation in which all the points of access to the network have the same value (conversely to certain prior-art solutions which emphasize a "master/slave" operation). Such embodiments are particularly suited to implementation in which the apparatuses of the network fluctuate, for example because the apparatuses (especially the power generators) are shifted, removed from the network or added to the communications network while other apparatuses of the network are operational and must communicate with one another.

In addition, such embodiments offer the advantage of limiting the need for maintenance of the communications network, especially for power plants grouping together a large number of power generators.

According to one particular embodiment of the invention, the communications method comprises:

comparing pieces of information data of a current frame with pieces of information data of at least one previously received frame, associating a piece of redundancy information with said current frame:

said piece of redundancy information being positive if the pieces of information data of said current frame are identical to the pieces of information data of a previously received frame, or said piece of redundancy information being negative, if the pieces of information data of no previously received frame are identical to the pieces of information data of said current frame, processing said received frame, if said piece of redundancy information is negative; and eliminating said received frame if said piece of redundancy information is positive.

Thus, the comparison step makes it possible to determine whether the pieces of information data of the frame being received are identical with those of a previously received frame, in which case the processing can consist simply, for example, of storing their reception, for example for purposes of statistics about the reliability of the network, or whether the frame is one comprising different pieces of information data, the content of which must be extracted and analyzed.

According to one particular embodiment of the invention, the method of communications comprises checking the reception of at least two frames having identical pieces of information data, and a step for generating an alert when the pieces of information data of a frame have been received in only one copy in a predetermined lapse of time.

Thus, it is possible to easily detect a problem or an anomaly, enabling speedy intervention if necessary. More generally, it enables a person in charge of monitoring the communications network and especially its Quality of Service, to be alerted to an appearance of a defect, even if this defect is not of critical importance and has no effect on the operational working of the network.

According to one particular characteristic of the invention, the method of communications comprises storing in a buffer memory at least one frame received during a lapse of time that is at least equal to said predetermined time interval.

It is possible, during the processing step, to await the reception and processing of at least one redundant frame of a missing frame (i.e., the reception of a second sending of information data, the first sending of which was unsuccessful) before the processing of the other frames, sent after this missing frame, which would have been received before the redundant frame. Thus, it is possible to restore the chronology of sending of the frames in reception.

According to one particular embodiment of the invention, verification frames are sent periodically with a predefined period by said interfacing device and the method of communications comprises one step for checking the periodic reception of at least two verification frames and one step for generating an alert when no verification frame has been received during said predefined period.

Thus, it is possible to periodically check the efficient operation of the communications chain with the interfacing device and, as the case may be, to speedily detect a malfunction in this communications chain, for example a malfunction of the interfacing device or of the communications network.

Such verification frames can, for example, comprise pieces of predefined information data.

According to another aspect, the invention pertains to a device for interfacing between at least one power generator and one network interconnecting at least two power generators, said device for interfacing being capable of sending and receiving communications frames, said frames comprising at least one piece of supervision data and one piece of information data.

According to one aspect of the invention, said interfacing device (or device for interfacing) comprises:
  means for sending the same pieces of information data at least twice, two operations for sending frames to be sent that comprise identical pieces of information data being separated in time by a predetermined time interval, and
  means for receiving, implementing a systematic elimination of one of the received frames when two frames comprising identical pieces of information data have been received.

Such an interfacing device can, for example, be situated in the common part of a power plant grouping together a set of power generators or situated in the control cabinet of at least one power generator.

According to one particular embodiment of the invention, the interfacing device implements at least one control module of a power generator and at least one switching module, said switching module comprising at least four connection ports:
  two ports for connection with said network;
  at least one port for connection with one of said control modules; and
  one port for connection with at least one distant interfacing element.

The ports for connection with a network can thus enable communications with an apparatus situated on the network, for example with another interfacing device or with a detached man/machine interfacing module.

The term "distant interfacing element" is understood in this description of the invention to mean an apparatus belonging to a communications network other than the network interconnecting the power generators or accessible by this other communications network.

Thus, the port for connection with at least one distant interfacing element can give access to an apparatus accessible from another communications network, for example an apparatus of a local area network such as a storage or printing peripheral or an apparatus of a WAN network such as an apparatus accessible by an Internet link, for example a distant server of the manufacturer of the interfacing device.

According to one particular embodiment of the invention, said control module comprises:
  at least two ports for connection with said switching module,
    a first port being allotted to the communications between said control module and other interfacing devices of the network, and
    a second port being allotted to the communications between said control module and a distant interfacing element; and
  at least one third port for connection allotted to the communications between said control module and a man/machine interfacing element.

According to one particular characteristic of the invention, said control module comprises CAN and/or RS485 type connection ports.

They can be ports for connection with the switching module or the man/machine interface module or with other modules of the interfacing device such as a regulation module or a protection module or an input/output module. They may also be ports for connection with a module of another interfacing device, for example, another control module of a same power generator or another power generator.

According to one particular aspect of the invention, the interfacing device furthermore comprises another man/machine interfacing module communicating with said control module.

In certain embodiments of the invention, it may be a man/machine interface module belonging to the interfacing device and communicating for example with said control module by means of the third connection port.

In other embodiments, which are possibly complementary embodiments, it can also be a remote man/machine interfacing module communicating for example with the control module by means of the switching module.

Thus, especially when the interfacing device is situated for example in a control cabinet of the power generator, the device can be a man/machine interface belonging to another interfacing device according to the invention or a computer or a tablet using the switching module of the interfacing device to dialog with the control module of the interfacing device and, therefore, control the power generator remotely.

According to one particular characteristic of the invention, the interfacing device implements at least two control modules, capable of controlling a same power generator, one of said control modules working as a back-up for a second of said control modules.

Thus, an embodiment such as this makes it possible to control the power generator either by means of a first control module, when this control module is operational, or by means of a second control module in the event of an at least partial inability to control the power generator by means of said first control module, for example, due to a malfunction of the first control module or a break in communications between the first control module and the power generator. Such an embodiment, therefore, increases the reliability of the interface device of the power generator.

According to one particular embodiment of the invention, said switching module comprises two ports for connection with said control modules:
  a first port being allotted to the communications between said control module and other interfacing devices, and
  a second port being allotted to the communications between said control module and at least one distant interface element.

According to one particular characteristic of the invention, said switching module sends the frames received on said first port or intended for said first port with a priority higher than that of the other frames to be sent coming from the other connection ports of said switching module.

Thus, it is possible to process particular pieces of information as a priority, for example information related to the power generator with which the device of the invention is interfacing and, therefore, increases the reactivity of the device. In particular, in certain embodiments, the frames to be sent by the switching module can be sent with a priority that takes account of the priority of the pieces of information data that they contain. For example, pieces of data on regulation and automation can be considered to have higher priority, the other pieces of data conveyed between interfacing devices therefore having lower priority, the data pertaining to the man/machine interface possibly having even lower priority and the pieces of data for interfacing with a distant interface element being considered to be data of even lower priority.

According to one particular characteristic of the invention, the interfacing device comprises means for programming the electrical behavior of at least one power generator.

According to one particular characteristic of the invention, said programming means implement an at least partial graphic representation of said network, modifiable via a touch-sensitive screen of said man/machine interfacing module.

According to one particular characteristic of the invention, said graphic representation implements a color representation, distinct colors being allotted in real time to each element of an electrical circuit, depending on whether the electrical current flows within this circuit.

Thus, through a graphic representation close to the one usually adopted for representing electrical diagrams, embodiments of the invention makes it easier for operators whose technical field of competence is electricity to take charge of the interfacing device.

According to one particular embodiment of the invention, said programming means comprise means for compiling and means for executing a program performed by an operator, said means for compiling and executing being implemented by said control module.

When the interfacing device comprises several control modules, one working as a back-up for the other, the means for compiling and executing can be implemented by each of the two control modules so as to enable a speedier "hot standby operation" by the back-up control module.

According to one particular characteristic of the invention, said programming means implement the "Ladder" (registered mark) programming language.

Such programming modes offer the advantage of enabling the programming of the man/machine interface of the device locally, hence without requiring additional means. Furthermore, they prevent certain difficulties related to the use of different computers for generating and using executable libraries, especially a necessity of porting libraries when these computers do not work with the same operating system or a substantial waiting time before the use of a new library, because for example of the characteristics of transmission between these computers (transmission flow rate, network cut-off, etc).

According to one particular embodiment of the invention, said programming means comprise means for the reading, by voice synthesis, of all or part of a program so as to enable its remote analysis and/or means for receiving and transcribing voice instructions.

BRIEF DESCRIPTION OF THE DRAWINGS

Other features and advantages of embodiments of the invention shall become more apparent from the following description, given by way of a simple illustrative and non-exhaustive example and from the appended drawings.

FIG. 8 illustrates an example of representation by "Ladder" diagram of a graphic object;

FIG. 9 illustrates an example of simulation of the right-hand click on a touch-sensitive screen for the "Ladder" programming of a graphic object;

FIG. 10 illustrates an example of a literal "Ladder" representation of a graphic object.

DETAILED DESCRIPTION

General Principle

It is possible especially to communications between power generators more reliable by improving the Quality of Service ("QoS") of the inter-apparatus communications network, especially by means of a mechanism of multiple operations for sending pieces of information data via at least two communications frames to be sent, two operations for sending frames that contain the same pieces of information data being spaced out by a period of time greater than the "worst-case recovery time" of the network. Thus, even if a malfunction occurs in the network, one of the frames sent will be received before the appearance of the malfunction or after the recovery of the network.

Figure 1A:
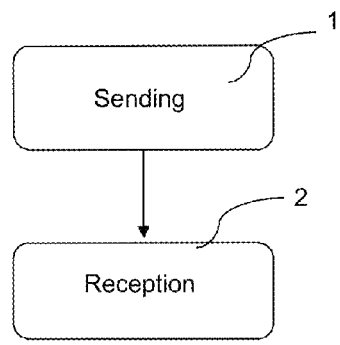
FIG. 1a illustrates the general principle of the method of communications of the invention.
Figure 1B:
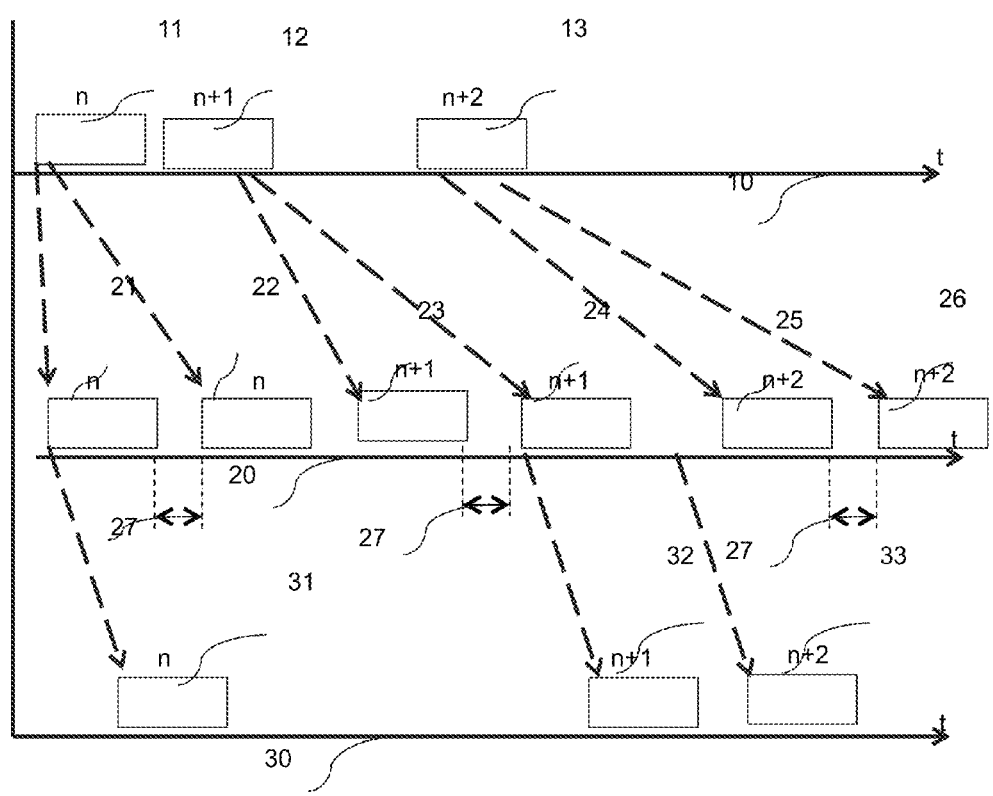
FIG. 1b shows an example of sequences of frames according to the method of communications according to the invention.

For example, in the particular case of communications through a self-recovering ring with a recovery time of less than 50 milliseconds, the same pieces of information data are sent at least twice, two operations for sending being spaced out by at least 50 milliseconds. FIGS. 1a and 1b illustrate the principle of the method of communications of the invention from complementary viewpoints.

Each power generator is connected to said network by means of at least one interfacing device capable of sending and receiving communications frames.

FIG. 1a illustrates the steps of the method of the invention, while FIG. 1b illustrates the influence on the sequences of frames to be sent according to the method of the invention.

More specifically, three temporal axes (10, 20, 30) are represented in FIG. 1b. The first temporal axis 10 represents a sequence of frames to be sent on the network. In the example illustrated, the sequence of frames comprises three consecutive frames (11, 12, 13), each comprising at least one piece of supervision data, for example a header (capable, in the particular embodiment illustrated, of comprising a piece of time-stamping information, a frame number, a MAC address of the frame-sending device, an identifier of a sending or destination module and/or device, etc) and at least one piece of information data.

According to one aspect of the invention, the communications method comprises a step for sending 1, illustrated in FIG. 1a, during which the pieces of information data of each of said frames to be sent (11, 12, 13) are sent at least twice.

The second temporal axis 20, illustrated in FIG. 1b, represents the sequence of frames resulting from the sending step 1, which is sent on the network. In the example illustrated, the sequence of frames resulting from the sending step 1 comprises six consecutive frames (21, 22, 23, 24, 25 and 26), the pieces of information data of the frames 21 and 22, 23 and 24, 25 and 26 being identical in sets of two (and the pieces of information data of each pair of frames sent corresponding respectively to the pieces of information data of the frames to be sent 11, 12, 13). As shown in FIG. 1*b*, the two operations for sending frames, on the network, that comprise identical pieces of information data are spaced out by a predetermined time interval 27.

This predetermined time interval is at least equal to the recovery time of the network so that, if a malfunction takes place in the network, one of the frames sent is received before the appearance of the malfunction or after the recovery of the network.

According to the invention, the method of communications comprises additionally step for receiving 2, illustrated in FIG. 1*a*, implementing a systematic elimination of one of the frames received when two frames having identical pieces of information data have been received.

The third temporal axis 30, illustrated in FIG. 1*b*, represents the sequence of frames resulting from the reception step 2, illustrated in FIG. 1*a*.

In the example illustrated in FIG. 1*b*, the sequence of frames resulting from the reception step 2 again comprises three consecutive frames (31, 32, 33).

The frame 31 corresponds to the frame 21, i.e., the first frame "n" sent on the network. The second frame sent 22 was eliminated during the reception step 2.

Thus, in the embodiment illustrated, the reception step keeps the first frame received among the frames sent 21 and 22 containing identical pieces of information data. An embodiment of this kind enables the frame received to be processed more speedily than other embodiments in which, when several frames having identical information data are received, only the last received frame is kept.

In the example shown in FIG. 1*b*, a malfunction in the network has occurred during the transmission of the frame 22. It has, therefore, not been received. However, since the predetermined time interval between the sending of the frames 23 and 24 is equal to or greater than the recovery time of the network, the network has already recovered at the time of the sending of the frame 24 which is, therefore, truly received during the reception step 2. The only frame "n+1" received during the reception step 2 is, therefore, the frame 32, corresponding to the frame sent.

Finally, the frame 31 corresponds to the frame 25, i.e. to the first frame "n+2" sent on the network. Consequently, according to the embodiment illustrated, the second frame sent 26 was eliminated during the reception step 2.

Architecture of a Control Device

Figure 2:
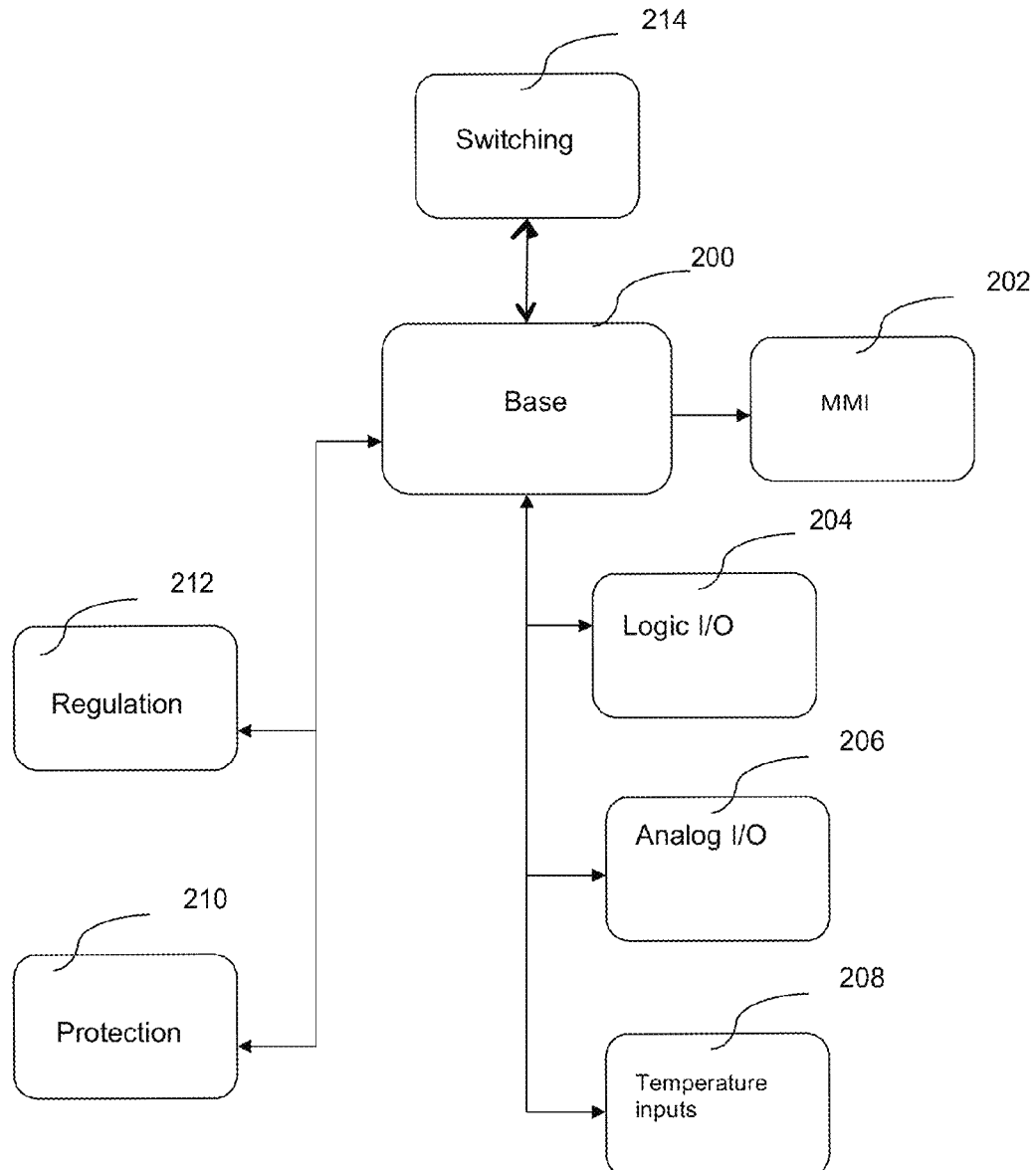
FIG. 2 illustrates the general principle of an interfacing device according to the invention.

Referring to FIG. 2, we present an example of the architecture of an interfacing device of at least one power generator according to one particular embodiment of the invention.

Depending on the embodiments of the invention, the interfacing device can enable the command, the control, the regulation and/or the protection of one or more power generators according to numerous configurations.

The configurations extend from the isolated power generator (known as a "solo" generator) with or without a source inverter, to power generators coupled to one another, making it possible to set up power plants which themselves can be coupled to one or more low voltage (LV) or medium voltage (MV) distribution networks.

Such an interfacing device can especially be installed on an independent control panel (for example an S9100 or S9200 control panel commercially distributed by the Applicant), in a casing accessible on at least one face of a power generator, or on a cabinet dedicated to the management of a set of power generators (or power plants), for example the "Iroise" cabinet commercially distributed by the Applicant.

Modules of the Interfacing Device

In the embodiment illustrated, the interfacing device drives at least one power generator. The interfacing device comprises several control modules, including one base module 200 for electronic measurements and automation, especially a module at least partially implementing the automaton programming standard IEC61131-3, for example the base module "X208" by the present applicant, a man/machine interface module 202, for example a man/machine interface module comprising a touch-sensitive screen, and a regulation module 212.

In other embodiments, the device can include several base modules and MMIs, one working as a back-up to the other, for example.

In certain embodiments, as in the embodiment illustrated, the interfacing device can also comprise logic input/output management modules 204, analog input/output management modules 206, temperature acquisition modules 208 and cut-off and protection modules 210, for example for controlling circuit-breakers. These modules are, however, optional.

Depending on the embodiments, the invention is implemented by means of software and/or hardware components. From this viewpoint, the term "component" can correspond in this document as much to a software component as to a hardware component or to a set of hardware and software components.

A software component corresponds to one or more computer programs, one or more sub-programs of a program or more generally to any element of a program or an item of software capable of implementing a function or a set of functions according to what is described here below for the modules concerned.

A software component of this kind is executed by a data processor of a physical entity (for example an electronic board, an integrated circuit, a smart card, a memory card, an electronic board) and is capable of accessing the hardware resources of this physical entity (memories, recording media, communications buses, input/output electronic boards, user interfaces, etc).

Similarly, a hardware component corresponds to any element of a hardware assembly capable of implementing a function or a set of functions for the module concerned. It may be a programmable hardware component or a component with an integrated processor for executing software, for example an integrated circuit, a smart card, a memory card, an electronic board for executing firmware, etc.

In the example illustrated, the modules of the interfacing device, especially the man/machine interface module and the control module, are constituted by electronic boards.

Figure 3:
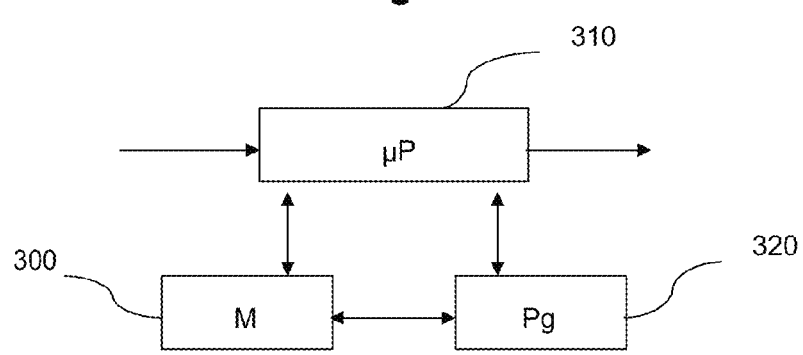
FIG. 3 illustrates an electronic board of a module of the device according to the invention.

Referring to FIG. 3, the simplified structure is presented of an electronic board of this kind according to the invention.

An electronic board comprises a memory 300 comprising a buffer memory, a processing unit 310 equipped for example with a microprocessor µP, and driven by a computer program 320, the execution of which implements at least a part of the communications method according to one of the particular embodiments of the invention.

At initialization, the instructions of the computer program product 320 are for example loaded into a RAM and then executed by the processor of the processing unit 310.

The processing unit 310 inputs a header of a data stream.

The microprocessor of the processing unit 310 implements certain steps of the communications method described here above according to the instructions of a computer program 320.

To this end, the electronic board comprises, in addition to the buffer memory 300, the means needed to implement the communications method of the invention.

These means are driven by the microprocessor of the processing unit 310.

Man/Machine Interface

According to the invention, the man/machine interface comprises a graphic screen, making it possible to drive at least one power generator. The man/machine interface may be situated on an isolated power generator and enable the control of this power generator. The machine interface may also be configured to control at least one power generator of a power plant. Such a man/machine interface can, for example, be located on one of the power generators of the power plant or on another apparatus, for example, a dedicated apparatus known in the rest of the application as a "Common Part". This interface enables the control of the power generator on which it is situated and, as the case may be, that of the other power generators of the plant.

In the embodiment illustrated, the graphic screen is a touch-sensitive screen for example, and adapted to the operating conditions of the power generator. Indeed, a power generator is often used outdoors, and this implies constraints on the equipment used. Thus, the touch-sensitive screen must be capable of being used in very bright sunlight. It should be capable of being resistant to dust and/or to weather vagaries and, for example, it should comply with the IP65 standard on ingress protection. It must also be resistant, for example, to fouling and impacts and should not be excessively responsive to such impacts.

For example, a hit by a bird settling on the screen should not be taken by the screen as action by an operator. The screen must also be adapted to use by people likely to act on a power generator who are working outdoors, for example a person standing upright, or wearing gloves. This involves constraints in terms of screen size and sensitivity, as the operators sometimes have difficulty in modulating the strength of the pressure they apply to the screen.

Exchanges with the Control Module of an Interfacing Device

Figure 4A:
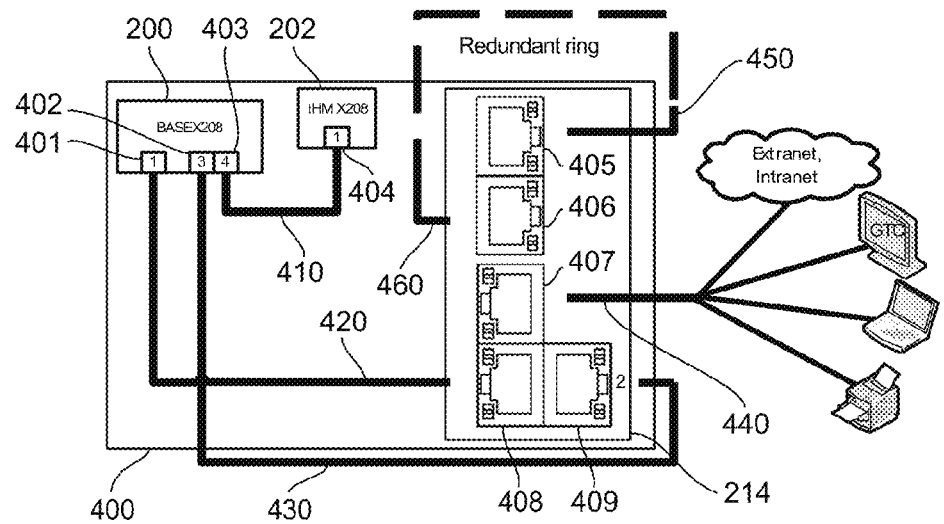
FIG. 4a illustrates the means of communications within an interfacing device as well as between this interfacing device and the remote apparatuses in one particular embodiment.

FIG. 4a illustrates communications between the modules of an interfacing device 400 as well as between these modules and remote apparatuses in a particular embodiment. The remote apparatuses can for example be remote interfacing devices, belonging to the same network of power generators or distant peripherals, not belonging to the network of power generators, for example a printer.

The particular embodiment illustrated in FIG. 4a comprises the control module 200 (for example the base module X208 by the Applicant), the man/machine interface module 202 and the switching module 214 of an interfacing device 400. The other modules which may be present on an interfacing device and represented for example in FIG. 2 do not appear in FIG. 4a. It is clear however that communications can be set up between these modules and the control module, for example by MODBUS.

The control module 200 can communicate directly with the man/machine interface 202, for example by means of an Ethernet or CAN link. Thus, according to FIG. 4a, a connection port 403 of the control module 200 is linked by means of the dedicated communications support 410 to a connection port 404 of the man/machine interface module 202.

The switching module 214 serves as an interface for setting up switching operations between the control module 200 and the apparatuses external to the interfacing device.

In the particular embodiment shown, different communications supports are implemented for the communications with the control modules of other interfacing devices and for the communications with an apparatus external to the network of power generators, for example, an apparatus belonging to another communications network, especially a distant interface element such as a distant website of a type workstation of a distant operator or a computer of a centralized technical management center.

Thus, in the embodiment illustrated in FIG. 4a, the switching module 214 comprises five connection ports:

two connection ports (405, 406) enabling communications with the network of power generators by means of two communications supports 450 and 460 (forming, in the particular case illustrated, a redundant ring);

a connection port 407, enabling communications with a distant interface element of an external network by means of a communications support 440; and two connection ports (408, 409) enabling communications with the control module 200, a first connection port 408 giving access to a support 420 dedicated to communications between the control module 200 and the control modules of the network of power generators, and a second connection port giving access to a support 430 dedicated to communications between the control module 200 and a distant interface element.

In a complementary way, in the embodiment illustrated in FIG. 4a, the control module 200 comprises two connection ports (401, 402) for connection with the switching module 214, a first port 401 giving access to a communications support 420 dedicated to communications with control modules of the network of power generators, and a second port 402 giving access to a communications support 430 dedicated to communications between the control module 200 and a distant interface element.

Such an embodiment makes it possible especially to process certain types of communication of a different priority by simply giving preference to certain connection ports.

Figure 4B:
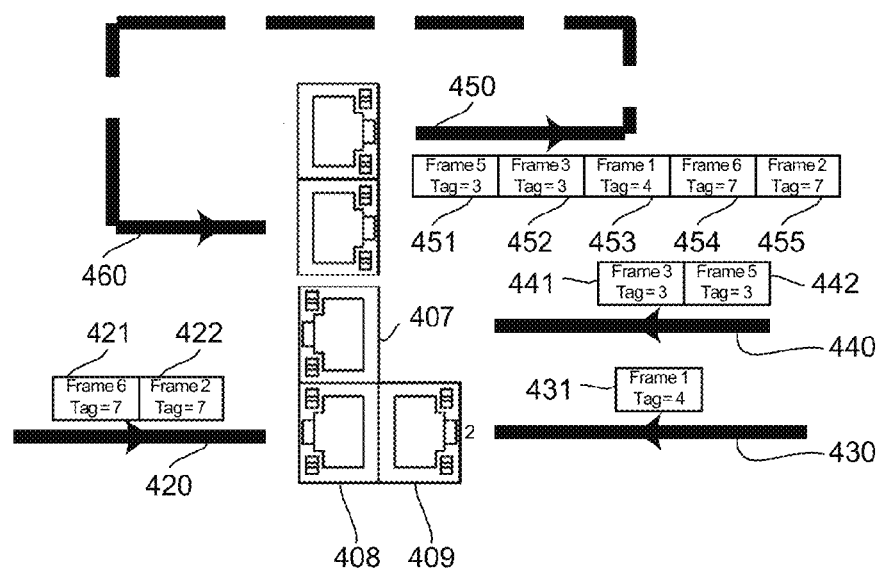
FIG. 4b illustrates the sending of the different communications frames by an interfacing device according to the invention in another particular embodiment.

Thus, in the embodiment illustrated in FIG. 4b, the frames (421, 422) sent by the control module 200 to the dedicated communications support 420 and to a remote control module correspond to pieces of information data likely to be important. Thus these frames are allotted (for example by the addition of a specific tag) a priority higher than that of the frames 431 received by the port 409, coming from the control module 200 and intended for a distant interface element and a priority higher than that of the frames 441 and 442 received at the port 407 coming from a distant interface element. Thus, the scheduling of the frames (451, 452, 453, 454 and 455) sent at output of the interfacing device take account of the priority of the frames received by the switching module. For example, as illustrated in FIG. 4b, the priority of sending of the frames can be determined according to the value of the tag that is allotted to them.

In a complementary way, in certain embodiments, the optimizing of the communications can include, in addition to the allotting of priority to the connection ports of the switching module, a limiting of the bandwidth allotted to certain non-priority connection ports.

In the particular embodiment shown, the communications supports are Ethernet buses. In other embodiments, possibly complementary ones, they may be optic fibers or CAN buses.

Figure 4C:
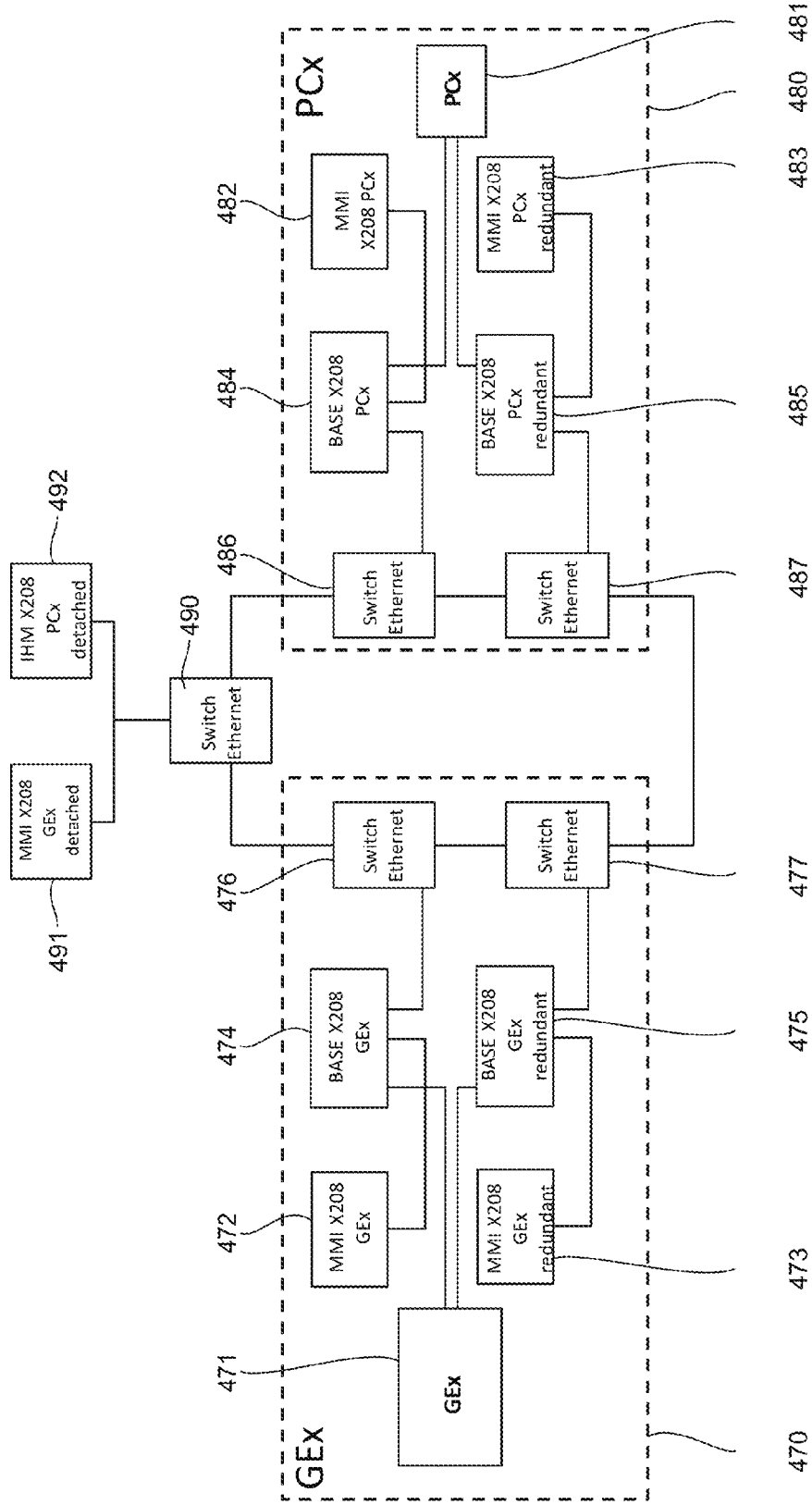
FIG. 4c illustrates the architecture of an interfacing device according to the invention in another particular embodiment.

FIG. 4c illustrates another embodiment of the invention in which certain modules of an interfacing device, especially modules of vital importance, are duplicated by redundant modules, which can be used in the event of malfunction of the duplicated module.

Depending on the embodiments, the redundant modules can be on standby or partially operational during the working of the duplicated module. For example, in the case of duplication of a man/machine interface module by a redundant man/machine interface module, when the duplicated man/machine interface module is operational, the redundant man/machine interface module can enable the display of the state of a power generator but will not offer the possibility of action on the power generator. FIG. 4c shows two interface devices comprising redundant modules.

A first interface device 470 interfaces with a power generator 471. Such a device is for example situated on one face of the power generator with which it interfaces.

In the embodiment illustrated, the set of modules comprising the first interfacing device 470 is duplicated to form two autonomous processing lines, one operational and the other capable of becoming operational in the event of a malfunction of the operational line. Such an embodiment thus maximizes the reliability of the interfacing device 470.

More specifically, the interfacing device 470 comprises two distinct man/machine interface modules (472, 473) each of which dialogs with a different control module (474, 475), each of these control modules (474, 475) being capable of controlling the power generator 471 and itself communicating with its own switching module (476, 477). Each of these switching modules (476, 477) constitutes a point of access to the network of power generators.

In one variant of this embodiment, the two control modules can share the same switching module.

The second interfacing device 480 shown in FIG. 4c is an interface device situated on the common part 481 of a set of power generators (for example a control cabinet giving access to several power generators). Its architecture is similar to that of the first interfacing device.

Thus, the second interfacing device comprises two autonomous processing lines in normal/standby operation, each processing line comprising a man/machine interface module (482, 483), a control module (484, 485) and a switching module (486, 487) interfacing with the common part 481.

Each of the control modules of the interfacing device shown in FIG. 4c can also be remote controlled by a detached man/machine interface module (491, 492) connected to the network of power generators.

Receiving a Communications Frame

Figure 5:
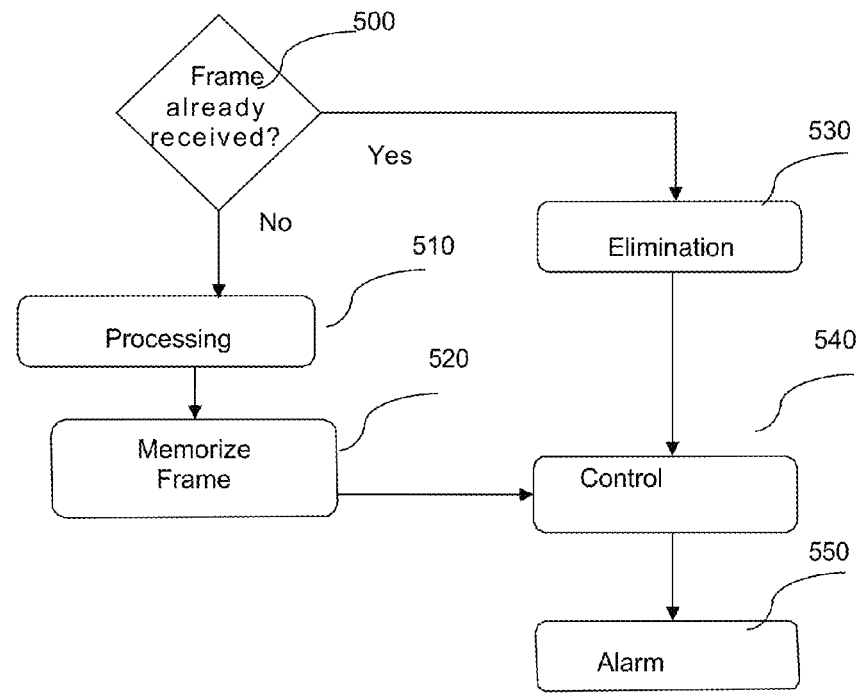
FIG. 5 illustrates the step for receiving of the method of the invention in one particular embodiment.

FIG. 5 presents the reception step 2 for receiving a communications frame according to the method of the invention, in one particular embodiment.

In the embodiment illustrated in FIG. 5, the reception step 2 thus comprises a step 500 for comparing a first set of pieces of information data contained in the frame being received with a second set of pieces of information data of at least one frame already received, and stored during the step 520 described here below.

If the first set of pieces of information data of the frame is not identical to any of the second sets of pieces of information data stored (or is not identical to the second set depending on the embodiments), and if the pieces of information data have not yet been received (hence from the first reception of the pieces of information data sent several times), the method implements a step 510 for processing the frame received. If not, in the particular embodiment presented, the first set of pieces of information data can be eliminated (these pieces of data having been already been processed when they were received in the second set).

The method, as in the embodiment described with reference to FIG. 5, can also include a step for storing 520 all the pieces of information data of the newly received frame. In addition to the pieces of information data, other pieces of data can also be stored. Thus, in certain particular embodiments, as in the embodiment illustrated in FIG. 5, this sub-step can include the memorizing of the entire frame received, and especially of at least some of the supervision data that it contains.

The number of sets of different pieces of information data stored depends on the embodiment of the invention. Thus, in certain embodiments, only the set of pieces of information data pertaining to the last received frame can be stored. In other embodiments, several sets of pieces of information data can be stored, for example the information data contained in the "n" last frames received. The sets of information data (as well as in certain embodiments the other pieces of data that may be stored) can, for example, be stored in a circular buffer.

If, during the step for comparing 500, the pieces of information data of the frame being received are identical to the pieces of information data of one of the stored sets of pieces of information data, in other words, if the pieces of information data of the frame being received have already been received, the method then eliminates the frame received (step 530).

In certain embodiments, the step of reception 2 of the method can also be a step 540 for controlling the reception of at least two frames comprising identical pieces of information data.

In particular, especially when the step for sending 1 comprises the sending of more than two frames comprising identical pieces of information data, the control step 540 can comprise a computation of the number of times in which a stored set of pieces of information data has been received. This computation can, for example, be implemented by means of a counter, initiated during the first reception of a set of pieces of information data, and then incremented at each new reception of a frame comprising the same set of pieces of information data.

In certain embodiments, this control step 540 can also include a step (not shown in FIG. 5) for initiating a time-out, associated with the stored set of pieces of information data, when the number of receptions of frames comprising identical information data is smaller than the predetermined number of operations for sending frames comprising identical information data, during the sending step of the method. This time-out can, for example, be greater than the maximum time needed for receiving subsequently sent frames comprising the same pieces of information data as those stored. In particular, it can be greater than the worst-case transmission time of the network when there is no network cut-off.

In certain embodiments, the reception step 2 can also comprise an alert step 50 in the event of non-reception of at least one expected frame.

In particular, an alert can be generated when pieces of information data have not been received as many times as they were sent, for example if, at the end of the initiated time-out, the value of the counter indicating the number of receptions of frames comprising identical pieces of information data is smaller than the predetermined number of operations for sending frames comprising identical information data during the step for sending of the method.

In other particular embodiments, possibly complementary ones, in which a particular frame is sent periodically, an alert can be generated when this frame is not received at the end of a period of time taking account of the period of sending of the periodic frame, the predetermined number of operations for sending frames comprising sets of identical pieces of information data, and the worst-case network transmission time when there is no network cut-off.

Programming

In certain embodiments, it is possible to command the working of an interfacing device in several control modes, especially a "programming" mode and a "run" mode in which the configurations defined are used by the interfacing device to control at least one power generator. The transition from one mode to another or the access to one of these control modules can, in particular, be protected by password.

Using the network, and the associated protocol, programming data can be efficiently transmitted between different entities connected to the network. It is possible, depending on the embodiments, to plan that certain specific frames will carry a marker indicating that the pieces of data transported are programming data.

The "programming" control mode can especially be used during the installation of the interfacing device. In certain embodiments, it can also be used subsequently while the interfacing device is operational, for example when the power generator is in "not n-service" mode or "automatic" operating mode to modify a display page of the man/machine interface of the interfacing device.

When the interfacing device is in "programming" control mode, the communications method can thus comprise a step for programming graphic objects, representing elements to be viewed.

The significance of these graphic objects can for example be defined by a standard programming language for programmable automatons, for example, a language recommended by the IEC 61131-3 industrial standard of the International Electrotechnical Commission (IEC) such as a "Ladder" diagram, an instructions list (IL), a structured text (ST), functional block diagrams (FBD), a sequential function chart (SFC).

In certain particular embodiments, the method can comprise a preliminary step for downloading graphic objects as well as their possible transcoding into source code files written, for example, in C language. These graphic objects are then controlled by the man/machine interface module while the source code files are transmitted to the control module to generate executable libraries. These executable libraries are then used by the processor of the control module when the interfacing device is in a control mode (for example a "Run" mode) to send dynamic information, obtained from the input/output modules and enabling the graphic objects to be animated dynamically, to the processor of the man/machine interface module.

In other embodiments, the method can comprise a step of definition, by an operator, of these graphic objects from the man/machine interface module of the interfacing device.

Figure 6:
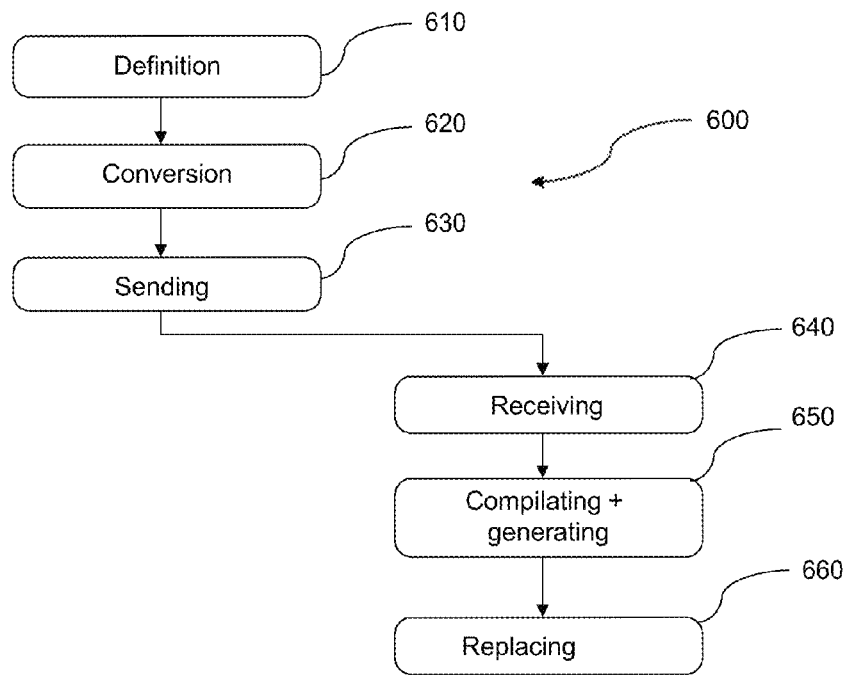
FIG. 6 illustrates the step of programming of the method of the invention in one particular embodiment.

FIG. 6 thus illustrates the programming step 600 of the method of the invention in one particular embodiment in which the interfacing device is in "programming" control mode and where the graphic objects are defined from the man/machine interface module of the interfacing device.

In the embodiment illustrated, the method thus comprises a sub-step 610 for defining graphic objects. This sub-step 610 can especially comprise the management of the display of the graphic objects, especially the integration of an image (such as a drawing of a button) or the definition of the rendering parameters, and the management of the meaning of the graphic objects, for example the indication of the element or elements that they represent, and associated logic variables.

This sub-step can also comprise a management of elements of consistency (compliance with naming rules, or with a grammar, etc). In the embodiment presented, this sub-step relies especially on certain aspects of the IEC 61131 standard.

For example, rules for naming variables, especially rules set forth by the IEC61131-3 standard, can be applied.

Thus, the name of a variable can follow the format: % L1 L2 N1.N2.N3, where:
  the prefix "%" is obligatory;
  L1 represents one of the letters I, Q or M, which respectively indicate a physical input variable, a physical output variable and a memory location;
  L2 is operational and represents one of the letters X, B, W or D, these letters respectively indicating a Boolean value, a byte, a 16-bit signed integer or a 32-bit signed integer;
  N1, N2, and N3 represent numbers respectively enabling designation of a module or particular bus, a card and an input.

Furthermore, a "table of variables" can be defined to contain all the names of variables that can be used for the programming so as to prevent an operator defining a graphic object from having to refer to documentation on the device or the IEC 61131 standard, and so as to facilitate subsequent diagnostics.

In the embodiment presented, this sub-step also relies on basic elements of the "Ladder" language and on customized function block constructions of the IEC 61131 standard, especially standard bistable function blocks, such as bistable reset dominant (or "Bistable RS") blocks and or bistable set dominant ("Bistable SR") blocks, counters, such as up-counters or down-counters, timers such as pulse timers (PT), on-delay timers (TON or T-0), off-delay timers (TOFF or 0-T). Operators of the IEC 61131 standard such as arithmetic operators or selection functions, for example the SEL (binary selection) function and comparison operators can also be implemented.

This may be a graphic definition of elements, as shown in FIG. 8. In this case, specific adaptations to the use of a touch-sensitive screen are implemented. For example, as illustrated in FIG. 9, to cope with the absence of mouse devices (and, therefore, the selection and/or designation by right-hand clicks), an automatic shaping of possible selections is dynamically displayed on the screen, for example in a part without representation or in a corner of the touch-sensitive screen.

A voice interface can also be proposed to enable, for example, dictation by telephone (when the programming is done by a remote operator especially). FIG. 10 illustrates an entry operation of this kind. In the same way, voice synthesis means can be provided for reading (more specifically for intelligibly transcribing) the current program and enabling a remote operator to know about it.

In the embodiment presented, the programming step 600 also comprises a conversion sub-step for converting 610 graphic objects defined in source code understandable by the control module of the interfacing device. In the embodiment presented, the graphic objects are thus converted into C language which is the language of the processor of the base module.

The programming step also comprises a sending sub-step 620 for sending the files obtained to the processor of the control module. In the embodiment illustrated, this sub-step comprises an encryption and a compression of files prior to their dispatch.

In the embodiment presented, the steps 610 for defining graphic objects, converting 620 these objects into C code files and sending 630 these C code files are implemented by the man/machine interface module. In other embodiments, possibly complementary embodiments, the man/machine interface module can also include means for downloading or acquiring (for example from a detachable storage support such as a USB stick or an external hard disk drive) graphic objects which are then converted during the conversion step 620 and sent during the sending step 630 to the control module.

In yet other embodiments, the step 610 for defining graphic objects, step 620 for converting these objects into C code files and step 630 for sending these C files can be implemented by other devices, for example a computer.

The programming step 600 also has other sub-steps which, in the embodiment illustrated, are implemented by the processor of the control module.

Thus, the programming step 600 comprises a sub-step 640 for receiving C files associated with the graphic object, possibly comprising their decompression and their decryption, a sub-step 650 for compiling received files and possibly other files already present in the control module (for example, files associated with other graphic objects using certain of the files received) and for generating a new executable library from these files.

Finally, the programming step comprises a sub-step 660 for replacing the library formerly used in the control mode (for example a "Run" mode) by the new library generated.

Figure 7:
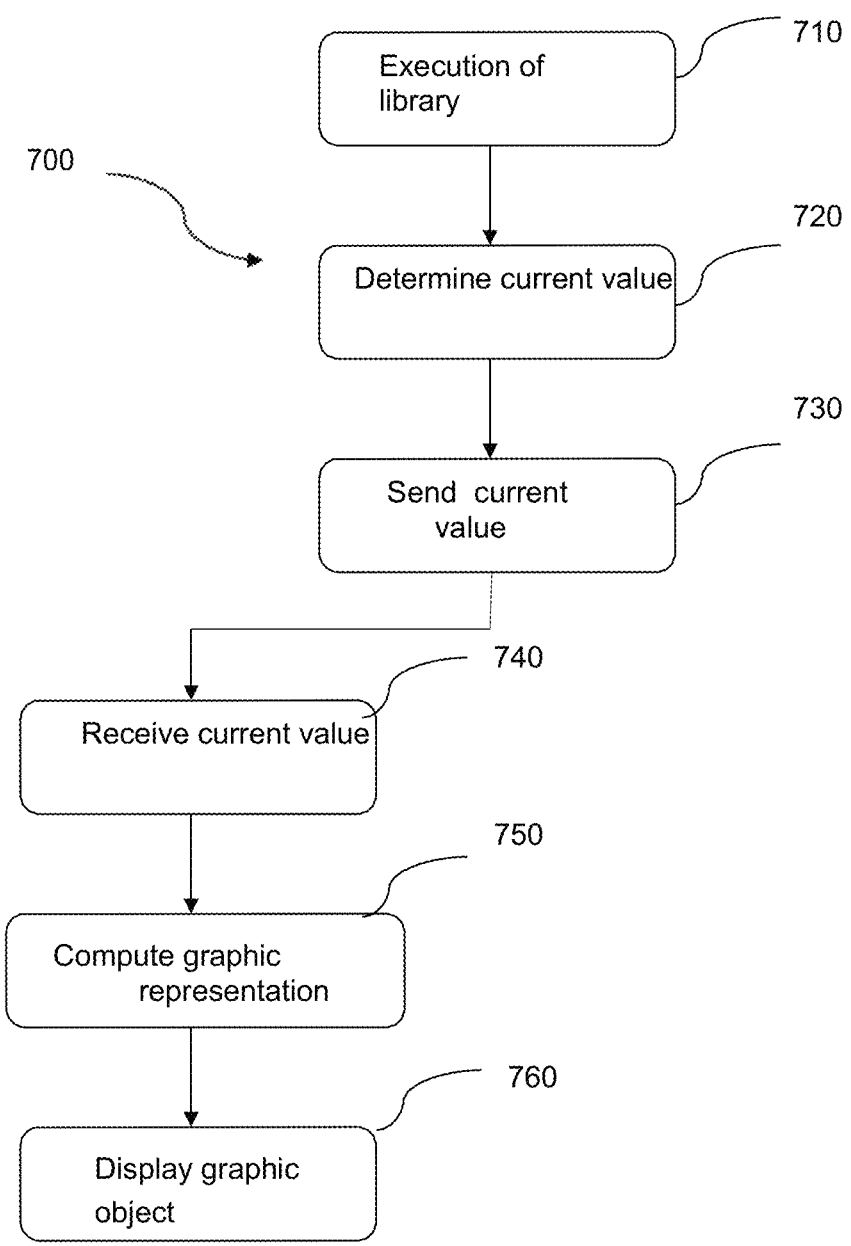
FIG. 7 illustrates the step of animation of a graphic object of the method of the invention in one particular embodiment.

FIG. 7 thus illustrates the step 700 of the invention for animating graphic objects, in a particular embodiment in which the interfacing device is in control mode (for example, a "Run" mode) and where the graphic objects have been defined from the man/machine interface module of the interfacing device during the step 600 described above, for example.

In the embodiment illustrated, the animating step 700 thus comprises a sub-step 710 for executing the executable library. This sub-step 710 can include the reception of data coming from the input modules (especially logic and analog input/output modules and temperature inputs) and the sending of data towards the logic and analog input/output modules.

In the embodiment presented, the animating step 700 also comprises a sub-step 720 for determining the current value of at least one variable associated with a graphic object and sub-step 730 for sending this current value to the man/machine interface module. In certain embodiments of the invention, the current value of each variable of a graphic object, or of each variable whose value has changed, is transmitted periodically to the man/machine interface module. In other embodiments, the re-computed and/or modified current values are sent towards the man/machine interface module as and when data is received from the input modules.

In the embodiment presented, the steps of execution 710, step 720 for determining and step 730 for sending the current value are implemented by the control module.

The animating step 700 also comprises other sub-steps which, in the embodiment illustrated, are implemented by the processor of the man/machine interface module.

Thus, the animating step 700 comprises a sub-step 740 for receiving the current value of at least one variable of a graphic object. It also comprises a sub-step 750 for computing the representation of a graphic object. In the particular embodiment illustrated, the colors and animating of the rendering of the graphic object are determined. This sub-step comprises especially a computation of the color code associated with each logic variable in order to facilitate diagnostics by an operator as indicated here above.

Finally, the animating step 700 comprises a sub-step 760 for displaying the graphic object.

According to another aspect, the programming step may comprise a step for programming certain aspects of the network (functions of the ports, levels of priority, insertion, modification or removal of an element) and/or protocol (duration of timer, number of repetitions, priorities, etc).

What is claimed is:

1. A communications method in a network interconnecting at least two power generators, each power generator being connected to said network by at least one interfacing device capable of sending and receiving communications frames, said frames comprising at least one piece of supervision data and at least one piece of information data, the method comprising:
    sending, via communications frames and via at least two operations, the same pieces of information data at least twice, the at least two operations being separated in time by a predetermined time interval,
    receiving the communications frames, and
    eliminating one of the frames received when two frames comprising identical pieces of information data have been received
    wherein said network is a self-recovering network capable of modifying a routing of a frame in the event of detection of an accidental cut in a portion of said network and said predetermined time interval is greater than or equal to a maximum time of recovery of said network.

2. The method of according to claim 1, further comprising:
    comparing pieces of information data of a current frame with pieces of information data of at least one previously received frame,
    associating a piece of redundancy information with said current frame:
        said piece of redundancy information being positive if the pieces of information data of said current frame are identical to the pieces of information data of a previously received frame,
        said piece of redundancy information being negative, if the pieces of information data of no previously received frame are identical to the pieces of information data of said current frame,
    processing said received frame, if said piece of redundancy information is negative; and
    eliminating said received frame if said piece of redundancy information is positive.

3. A device for interfacing between at least one power generator and one network interconnecting at least two power generators, said device for interfacing being capable of sending and receiving communications frames, said frames comprising at least one piece of supervision data and one piece of information data, the device comprising:
    means for sending the same pieces of information data at least twice via at least two operations the at least two operations being separated in time by a predetermined time interval, and
    means for receiving communications frames, said means implementing a systematic elimination of one of the received frames when two frames having identical pieces of information data have been received
    wherein said network is a self-recovering network capable of modifying a routing of a frame in the event of detection of an accidental cut in a portion of said network and said predetermined time interval is greater than or equal to a maximum time of recovery of said network.

4. A device for interfacing according to claim 3, the device comprising at least one control module and at least one switching module, said at least one switching module having at least four connection ports:
    two ports for connection with said network;

at least one port for connection with one control module of said at least one control modules; and one port for connection with at least one distant interfacing element.

5. A device for interfacing according to claim 4, wherein said one control module comprises:

at least two ports for connection with said at least one switching module,
- a first port being allotted to communications between said one control module and other interfacing devices of the network, and
- a second port being allotted to communications between said one control module and the at least one distant interfacing element; and at least one third port for connection allotted to communications between said one control module and a man/machine interfacing element.

6. A device for interfacing according to claim 3, comprising at least two control modules, one of said control modules working as a back-up for the other of said control modules.

7. A device for interfacing according to claim 4, wherein said at least one switching module comprises two ports for connection with said at least one control module:

- a first port being allotted to communications between said at least one control module and other interfacing devices, and
- a second port being allotted to communications between said at least one control module and at least one distant interface element.

8. A device for interfacing according to claim 3, further comprising means for programming electrical behavior of at least one power generator.

9. A device for interfacing according to claim 8, wherein said programming means comprise means for compiling and means for executing a program performed by an operator, said means for compiling and executing being implemented by a control module.

* * * * *